United States Patent
Barson et al.

(10) Patent No.: US 11,875,666 B2
(45) Date of Patent: Jan. 16, 2024

(54) POWER SOURCE ARRANGEMENTS FOR SELF-TESTING ALARM SYSTEMS

(71) Applicant: Honeywell International Inc., Charlotte, NC (US)

(72) Inventors: Michael Barson, Nuneaton (GB); Benjamin H. Wolf, Leicester (GB); Christopher Dearden, Melton Mowbray (GB)

(73) Assignee: Honeywell International Inc., Charlotte, NC (US)

(*) Notice: Subject to any disclaimer, the term of this patent is extended or adjusted under 35 U.S.C. 154(b) by 116 days.

(21) Appl. No.: 17/316,982

(22) Filed: May 11, 2021

(65) Prior Publication Data

US 2022/0366778 A1   Nov. 17, 2022

(51) Int. Cl.
| | |
|---|---|
| G08B 29/18 | (2006.01) |
| G08B 29/04 | (2006.01) |
| H02J 9/06 | (2006.01) |
| H02J 7/00 | (2006.01) |

(52) U.S. Cl.
CPC ........ *G08B 29/181* (2013.01); *G08B 29/04* (2013.01); *H02J 9/06* (2013.01); *H02J 7/00* (2013.01)

(58) Field of Classification Search
CPC ........ G08B 29/04; G08B 29/181; H02J 9/06; H02J 7/00
USPC .................................................. 323/242
See application file for complete search history.

(56) References Cited

U.S. PATENT DOCUMENTS

| | | | |
|---|---|---|---|
| 5,621,394 A | 4/1997 | Garrick et al. | |
| 9,659,485 B2* | 5/2017 | Piccolo, III | G08B 29/145 |
| 9,679,468 B2* | 6/2017 | Piccolo, III | G08B 29/145 |
| 9,767,679 B2* | 9/2017 | Piccolo, III | G08B 29/145 |
| 9,824,561 B2* | 11/2017 | Brigham | G08B 17/10 |
| 11,335,183 B2* | 5/2022 | Miagkov | G08B 29/126 |
| 2012/0171987 A1 | 7/2012 | Newman | |
| 2015/0145684 A1 | 5/2015 | Schmid | |
| 2016/0364978 A1* | 12/2016 | Warren | H04R 3/00 |
| 2018/0293878 A1 | 10/2018 | Penney | |
| 2020/0264685 A1 | 8/2020 | Jondu et al. | |
| 2021/0065536 A1 | 3/2021 | Dearden et al. | |
| 2021/0142653 A1* | 5/2021 | Miagkov | G08B 29/22 |

FOREIGN PATENT DOCUMENTS

| | | |
|---|---|---|
| CN | 207083310 U | 3/2018 |
| CN | 111968354 A | 11/2020 |
| DE | 1566823 A1 | 4/1970 |
| WO | 2003048796 | 6/2003 |

\* cited by examiner

*Primary Examiner* — Yemane Mehari
(74) *Attorney, Agent, or Firm* — Brooks, Cameron & Huebsch, PLLC

(57) ABSTRACT

Devices, systems, and methods for self-testing event devices of a building alarm system are described herein. One self-test alarm system device having a self-testing capability includes a first independent power source connected to a detector module and a second independent power source connected to a self-test module.

18 Claims, 6 Drawing Sheets

POWER SOURCE ARRANGEMENTS FOR SELF-TESTING ALARM SYSTEMS

TECHNICAL FIELD

The present disclosure relates to devices, systems, and methods for power source arrangements for self-testing alarm systems.

BACKGROUND

Facilities (e.g., buildings), such as commercial facilities, office buildings, hospitals, and the like, may have an alarm system that can be triggered during an emergency situation (e.g., a fire) to warn occupants to evacuate. For example, an alarm system may include a control panel (e.g., a fire alarm control panel) within the building and a plurality of event sensing self-test alarm system devices (e.g., hazard sensing devices, such as fire detectors, smoke detectors, carbon monoxide detectors, carbon dioxide detectors, other harmful chemical detectors, audio-visual monitoring devices, etc.) located throughout the facility (e.g., on different floors and/or in different rooms of the facility) that can sense a hazard event occurring in the facility and provide a notification of the hazard event to the occupants of the facility and building monitoring personnel via alarms or other mechanisms.

These self-test alarm system devices need to be periodically checked to ensure that they are operating properly. Some such devices have mechanisms included within the device that test the function of the self-test alarm system device to make sure it is functioning properly. These mechanisms are referred to as self-test mechanisms and such self-test alarm system devices are referred to as self-test self-test alarm system devices.

In an alarm system that uses self-testing self-test alarm system devices, the devices include software/firmware and/or hardware to allow the sensing device to perform a self-test to determine that the self-test alarm system device is operating correctly. A self-testing fire alarm system self-test alarm system device can, for example, include a particle generator and an airflow generator configured to generate an aerosol to trigger a fire response by a smoke sensor within the device to determine whether the self-testing fire sensing self-test alarm system device is functioning properly based on the fire response and the determined airflow rate.

Some self-test components use a large amount of power (e.g., in some instances, in the range of 3-4 Watts) during the self-test process. Since one power source is typically used for all of the components of such self-test alarm system device within an alarm system, the large power draw from all of these devices means that, on wired-loop based fire systems, the self-testing would need to be accomplished on only one device at a time. This means, that it can take significant time to carry out each test, as each individual self-test self-test alarm system device would need to be tested in series.

Therefore, the system would need to be placed in test mode for a considerable amount of time (e.g., in the region of one hour for a electrically connected loop having 150 detectors). While the system can be returned to active mode in between tests to check for fire events, it does mean that the facility may not get immediate responses to a real fire, either by a pull station being activated or a detector signaling a hazard event alarm.

Due to the power requirements of using the self-test technology, this may also limit the ability to use the self-test detectors in, for example, large, electrically connected, wired loops/spurs with long cable runs. This can lead to restrictions in the way the self-test technology can be used in some implementations.

Also, within smaller simpler and/or more compact sites a visual inspection could potentially be carried out more quickly than the self-tests on the devices. Such delays in self-testing can lead to 'down time' for expensive technicians.

Further, in some current wireless fire alarm systems, primary batteries within the self-test alarm system device are used to power all the detectors of an alarm system. However, the battery monitoring may not always be carried out effectively.

For example, although they are constantly monitored for capacity, under current processes, it may be difficult to give an accurate assessment of how much capacity re within the battery. It is important to get an accurate view in order to ensure they are still viable and not coming toward the end of their life. Often batteries are replaced either too early or, worse still, too late, leading to a compromised fire system or an additional visit from a technician.

DETAILED DESCRIPTION

Figure 1:
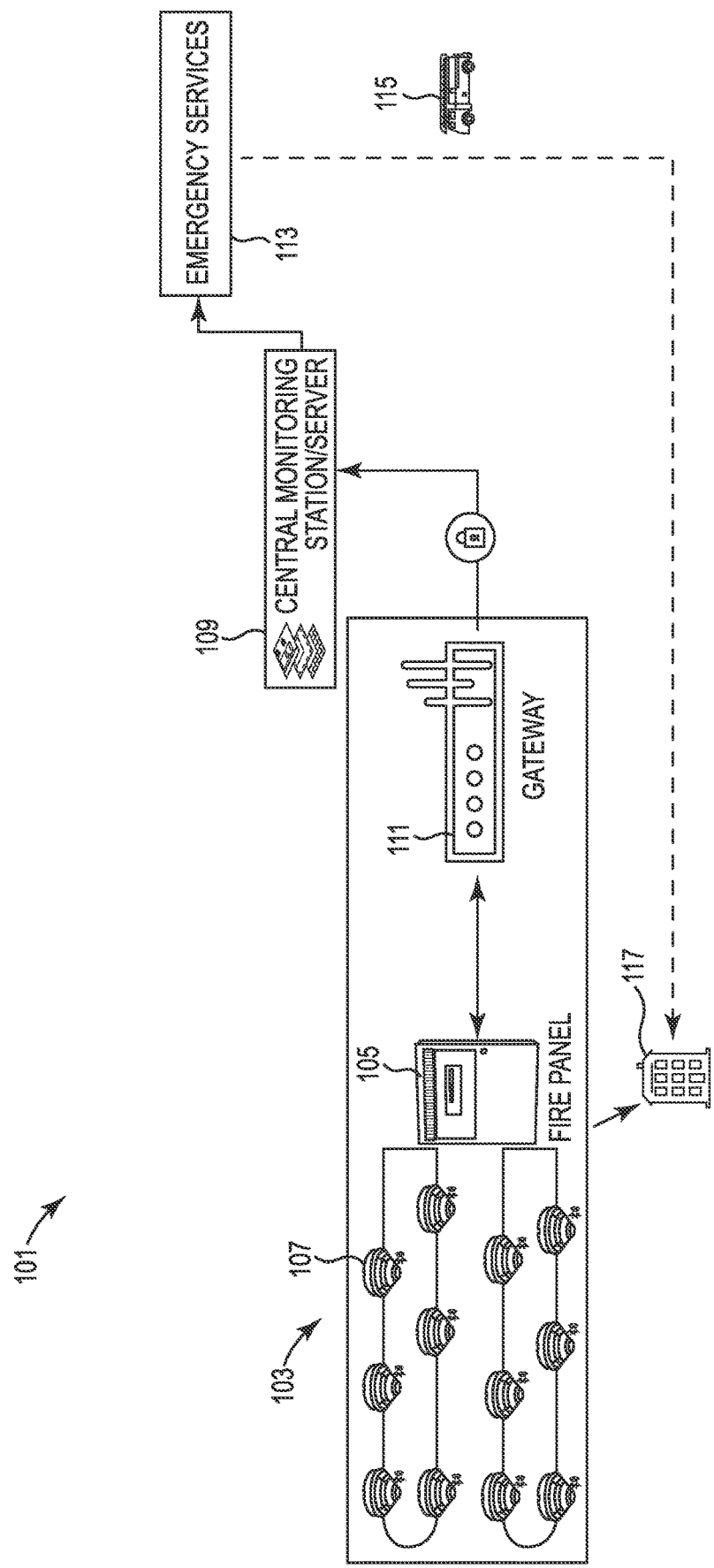
FIG. 1 is an example of an alarm system having a number of self-testing self-test alarm system devices that can be used in accordance with one or more embodiments of the present disclosure.

Devices, systems, and methods for power source arrangements for self-testing alarm systems are described herein. The embodiments of the present disclosure enhance self-test arrangements for wired alarm systems and can speed up the self-testing process as well as giving more accurate readings on battery capacities, among other benefits. In such systems, it can be important to have an accurate battery measurement as the self-testing process must be able to work reliably over the life of the self-test alarm system device while potentially using a significant amount of power.

Examples of embodiments of the present disclosure include a self-test alarm system device having a self-testing capability wherein the device includes one of: a self-test module powered by an integrated primary wired power source or battery; or a self-test module powered by an integrated secondary wired power source. Another embodiment includes a self-test alarm system device having a self-testing capability, the device includes a first independent power source connected to a detector module and a second independent power source connected to a self-test module.

For wired applications—the self-test module powered by a local power source or battery would (when placed in self-test mode) enable the detector to draw current from the integrated power source in order to carry out a self-test function. This arrangement will also enable all detectors on the loop, with this power source, to be able to simultaneously go into self-test mode on the loop. Such an arrangement can, for example, provide self-testing results back to the technician for the whole all self-testing devices on the system in less than one minute. This can be irrespective of the size of site and installation as the power sources are located local by the self-testing self-test alarm system devices.

This results in lower down time for the technician and safer testing of the alarm system as it would be in test mode for only a limited amount of time and, therefore, (once the self-testing has been completed) it would enable alarm system to come back to active mode status very quickly.

A further application for embodiments of the present disclosure is for alarm systems with heavy loading of devices on alarm system loops/spurs or with devices having longer cable lengths. These devices could be used at the extremities of the alarm system, in order to enable the self-test processes to be carried out effectively, for example, on the most challenging applications.

In such implementations, for wireless applications—the self-test module powered, for example, by radio frequency (RF) detectors existing wired power source/battery or a dedicated wired power source/battery, when placed in self-test mode would enable the detector to draw current from the specified power source in order to carry out the self-test function. Further, such embodiments enable all detectors on the RF system with this function to simultaneously go into self-test mode.

This can provide results back to the technician, for example in less than one minute, irrespective of the size of site and installation. Again, this can result in lower down time for the technician and safer testing of the alarm system, as it would be in test mode for only a limited amount of time and, therefore, (once the test has been completed) it would enable the alarm system to come back to active mode status very quickly.

A further application for embodiments of the present disclosure relates to battery load testing. As the self-test process draws a significant amount current, this implementation will place the self-test alarm system devices into a load test. A load test allows for the opportunity to get a reading on the battery capacity and determine, for example as part of routine maintenance, whether the batteries providing power to a specific self-test alarm system device need replacement. This process can be accomplished, for example, by a controller attached to the self-test alarm system devices.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 107 may reference element "07" in FIG. 1, and a similar element may be referenced as 207 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of an alarm system having a number of self-testing self-test alarm system devices that can be used in accordance with one or more embodiments of the present disclosure. In the illustrated embodiment, an alarm response system 101 includes a building alarm system 103 within a building 117, a central monitoring station having at least one computing device 109 with links to a number of emergency service providers 113 that can, for example, dispatch emergency personnel 115 (e.g., fire fighters) to the building 117.

The emergency personnel can be dispatched, for example, in response to an event alarm signal being generated by the control panel 105 within the alarm system 103. An event alarm signal is generated in response to data from one or more alarm system self-test alarm system devices 107 (e.g., self-test alarm system devices, such as smoke detectors) within the alarm system indicating that an event (e.g., a fire) may be occurring.

The alarm system can be any system that is used to monitor events that will affect occupants of the building. Examples of suitable alarm system types include fire alarm, building security, and building access systems. As shown in FIG. 1, the alarm system illustrated is a fire alarm system and includes a number of alarm system devices 107 and a control panel for managing the operation of the alarm system and its devices.

As used herein, the term "control panel" refers to a device to control components of an alarm system of a facility (building). For example, the control panel 105 can be a fire control panel that can receive information from event devices 107 and determine whether a hazard event is occurring or has occurred.

The control panel 105 can be connected to the number of alarm system devices 107. As used herein, the term "alarm system device" refers to a device that can receive an input relating to an event. Such an event can be, for instance, a hazard event such as a fire. For example, an alarm system device can receive an input relating to a fire occurring in the facility. Such alarm system devices 107 can be a part of an alarm system of the facility and can include devices such as fire sensors, smoke detectors, heat detectors, carbon monoxide (CO) detectors, other chemical detectors, or combinations of these; interfaces; pull stations; input/output modules; aspirating units; and/or audio/visual devices, such as speakers, sounders, buzzers, microphones, cameras, video displays, video screens, among other types of alarm system devices.

These alarm system self-test alarm system devices 107 can be automatic, self-test devices, such as smoke detectors, heat detectors, CO detectors, and/or others. Such self-test devices can include mechanisms that generate aerosols, heat, carbon monoxide, etc. and sense these items, as appropriate to the type of device being tested, in the device to test the performance of the device. This can, for example, be used to test the self-test alarm system device's thermal, chemical, and/or photo sensing capabilities.

The alarm system 103 can also include an edge/gateway device 111. The gateway device acts as a pass through device for communicating between the alarm system 103 in the building and the central monitoring station 109 and other components of the response personnel status system 101 that are at remote locations (i.e., outside the building).

In the embodiments of the present disclosure, a gateway device of an alarm system at a facility (building) reports event alarm signals to one or more central monitoring servers. These servers may be on premise (within the facility) or, as shown in the example of FIG. 1, off premise (at a remote location from the alarm system components).

From there, the event alarm signals are reported to the appropriate central monitoring station that includes administrators that coordinate activities to respond appropriately based on the type of event that is occurring. For example, a fire event would need a fire based response that would likely include alerting a fire station to send trucks and contacting medical personnel, if injuries seem likely. For a security issue, security personnel and/or the police would be contacted. The central monitoring servers are connected back to one or more alarm systems on site and/or remote (cloud) servers.

Figure 2:
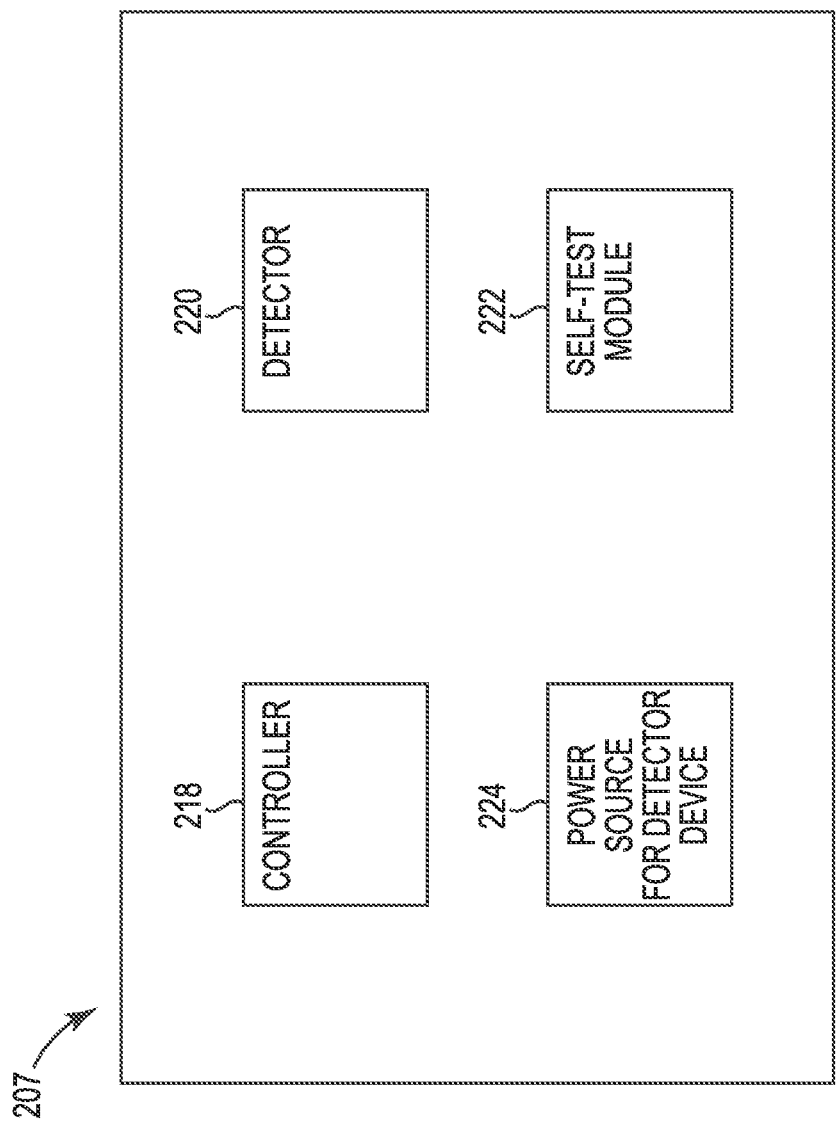
FIG. 2 is an example of a self-test alarm system device having self-test capabilities in a self-testing alarm system, in accordance with one or more embodiments of the present disclosure.

FIG. 2 is an example of a self-test alarm system device having self-test capabilities in a self-testing alarm system, in accordance with one or more embodiments of the present disclosure. The self-testing self-test alarm system devices of an alarm system such as alarm system 103 of FIG. 1 have several components that need power from a power source in order for the device to function properly. The power source connections have intentionally not been made in FIG. 2 to emphasize the parts of such a device and as the several connection arrangements will be discussed in more detail below. As shown in the embodiment of FIG. 2, a self-test alarm system device 207 can have a controller 218, a detector 220, a self-test module 222, and a power source for the self-test alarm system device 224.

The controller 218 can include a processor and memory or firmware to carry out control functions for the self-test alarm system device. For example, memory can have instructions and/or data stored therein, where the executable instructions are executable by the processor to carry out control functions to control the detector 220 and/or the self-test module 222. Discussed below are several power source arrangements for connecting these and other self-test alarm system device components to one or more power sources.

Figure 3:
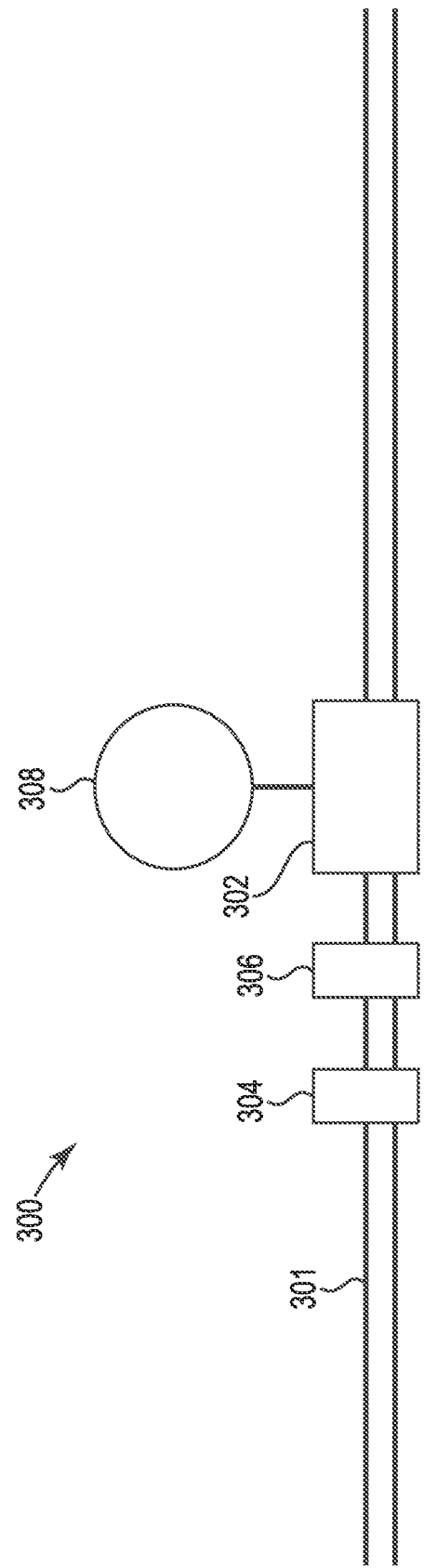
FIG. 3 is an example of a power source arrangement for a self-testing alarm system, in accordance with one or more embodiments of the present disclosure.

FIG. 3 is an example of a power source arrangement for a self-testing alarm system, in accordance with one or more embodiments of the present disclosure.

Illustrated in FIG. 3 are a number of components within a self-test alarm system device 300 of an alarm system. As illustrated, the components include a self-test module 308 electrically connected to a power source 302. The power source 302 is connected to the power loop 301 that provides power for the self-test alarm system device. As used herein, the power loop is a wired loop that can be used for distribution of power to components of the self-test alarm system device, such as a detector module or an audio or visual alarm indicator (e.g., strobe or siren).

In some implementations, the powered loop can also be used as a communication loop. One example of a wired power loop having a communications component could be 24V to 48V DC power, with digital communications/data modulated on to it.

Also connected to the power loop 301 is a controller 304 and a charger 306. As used herein, a controller can be used to control the functions of the detector module. A controller can also be used to control the functions of the self-test module. In some embodiments, a single controller can control the functions of the detector and self-test module.

A charger can be used to extract power from the power loop and distribute it to the power source 302. This can allow the power source to be charged over time as the self-test module uses the power in the power source. In such embodiments, the power source can be a battery or a capacitor (e.g., a super capacitor).

The embodiment illustrated in FIG. 3 includes a first independent power source (not shown) connected to a detector module (not shown) and a second independent power source 302 connected to a self-test module 308. In this manner, power can be independently provided to the detector module and the self-test module, by different power sources.

Further, as illustrated, the second independent power source 302 can be directly electrically connected to the power loop 301. In this manner, the second independent power source can receive consistent power over a long period of time without interruption.

Additionally, in some embodiments, the second independent power source 302 can be directly electrically connected to the self-test module 308. The second independent power source can also be directly electrically connected to the power loop in addition to its direct connection to the self-test module. In such embodiments, as shown in FIG. 3, the second independent power source 302 receives a trickle charge from the power loop. The trickle charge keeps the second independent power source charged, but does not overly reduce power available at the power loop as it trickles lower power to the second independent power source over a long period of time.

The self-test alarm system device can include a controller directly electrically connected to a power loop. The controller can, for example, be powered by the power loop and can control the flow of power to and from components such as the charger, the power source, and the self-test module.

In some embodiments, the self-test alarm system device can include a charger directly electrically connected to a power loop. The charger can also or alternatively be directly electrically connected to the second independent power source. Such embodiments allow the charger to transfer power from the power loop to the self-test module.

In embodiments described herein, the second power source (connected to the self-test module) can be used to operate the self-test module while the detector module is being powered by the first power source (e.g., power, capacitor, or primary battery). Such a structure cannot be utilized in prior power arrangements, as secondary backup power sources in alarm systems, generally, have only been used as backup sources for when the primary power source is inaccessible and self-test devices have heretofore not had any secondary power sources at all.

Figure 4:
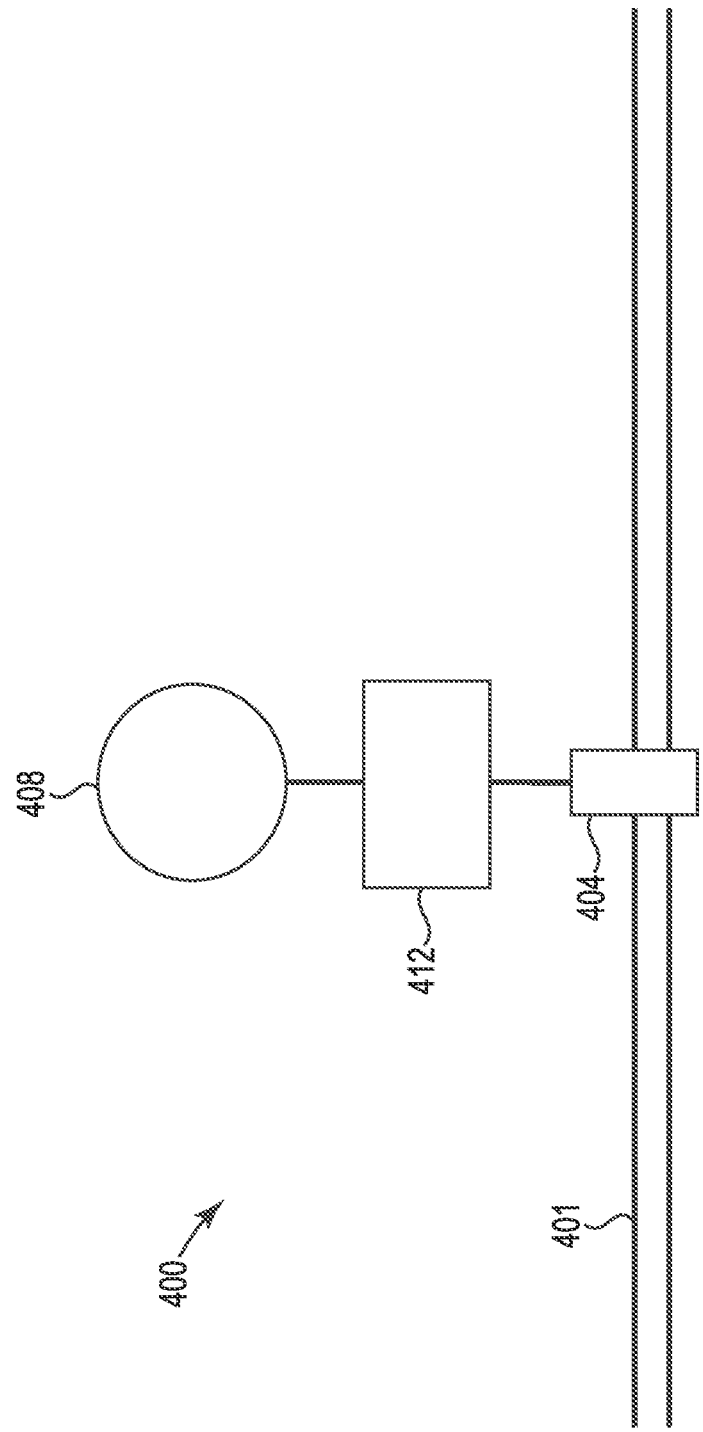
FIG. 4 is another example of a power source arrangement for a self-testing alarm system, in accordance with one or more embodiments of the present disclosure.

FIG. 4 is another example of a power source arrangement for a self-testing alarm system, in accordance with one or more embodiments of the present disclosure. As illustrated, the components of the self-test alarm system device 400 include a self-test module 408 electrically connected to an independent power source 412. The independent power source 412 is electrically connected to the controller 404 which is directly electrically connected to power loop 401 for the self-test alarm system device. However, in this embodiment, the power source 412 does not receive any power from the power loop 401. The power loop 401 does provide power to the controller 404 and other components of the self-test alarm system device, such as the detector module.

In the embodiment illustrated in FIG. 4, the self-test alarm system device 400 having a self-testing capability includes a first independent power source connected to a detector module (not shown) and a second independent power source connected to a self-test module. In this example, the second power source 412 (e.g., a battery) is electrically connected between the self-test module 408 and a controller 404. For example, the controller can be directly electrically connected to the second independent power source. Further, in some instances, the controller can be directly electrically connected to a power loop.

Figure 5:
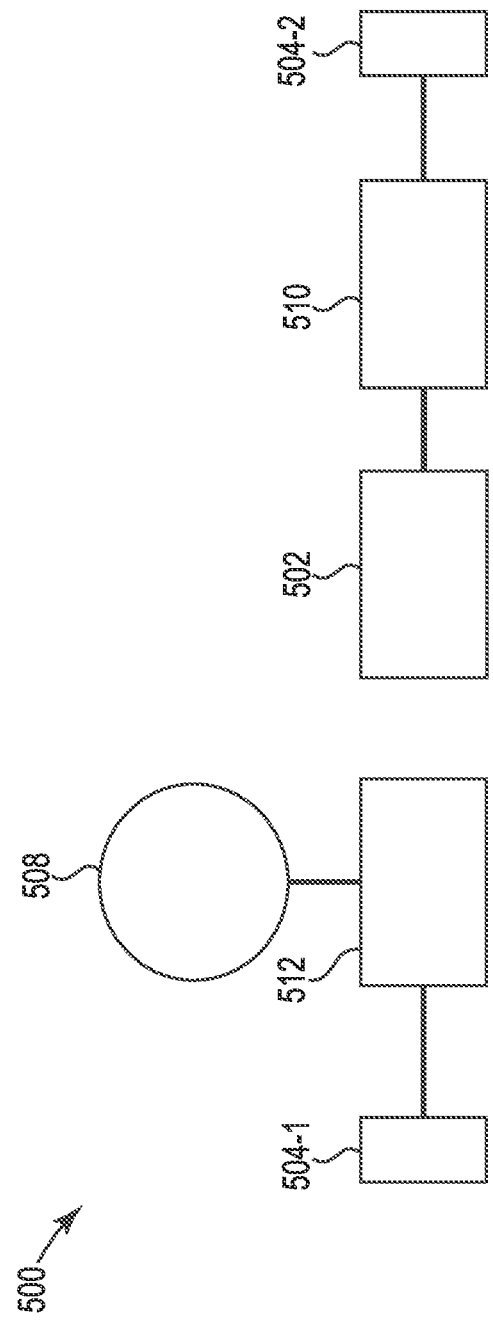
FIG. 5 is another example of a power source arrangement for a self-testing alarm system, in accordance with one or more embodiments of the present disclosure.

FIG. 5 is another example of a power source arrangement for a self-testing alarm system, in accordance with one or more embodiments of the present disclosure. As illustrated, the components of the self-test alarm system device 500 include a self-test module 508 electrically connected to an independent secondary power source 512 (e.g., a battery). The independent secondary power source 512 is electrically connected to the controller 504-1. On a separate circuit, an independent primary power source 502 (e.g., a battery) is electrically connected to a detector 510 that is electrically connected to a controller 504-2. In such an embodiment, both circuits do not need to be connected to power. In this manner, these devices can be utilized without wiring to power, allow for greater flexibility in installation locations, among other benefits.

As shown in the embodiment of FIG. 5, a self-test alarm system device having a self-testing capability can include a first independent power source connected to a self-test module and to a controller, wherein the first independent power source is not connected to a power supply.

In this implementation, the controller 504-1 can provide a number of functions regarding the operation of the circuit. For example, the controller can control the metering of power to the self-test module and/or the initiation of a self-test process. As illustrated in FIG. 5, the first independent power source can be electrically connected between the self-test module and the controller.

In some embodiments, the self-test alarm system device includes a second independent power source 502 connected to a detector module 510 with the second power source not connected to a power supply. Further, in some embodiments, the second independent power source 502 can be electrically connected to a controller 504-2.

In this manner, the second independent power source can also be electrically connected to a controller that is different from the controller connected to the first independent power source. This allows the controllers to each control functions of their own circuit independent of each other.

Additionally, in various embodiments, the detector module can be a battery powered, wireless, detector module. Likewise, the first independent power source connected to the self-test module can also be a battery power source.

Figure 6:
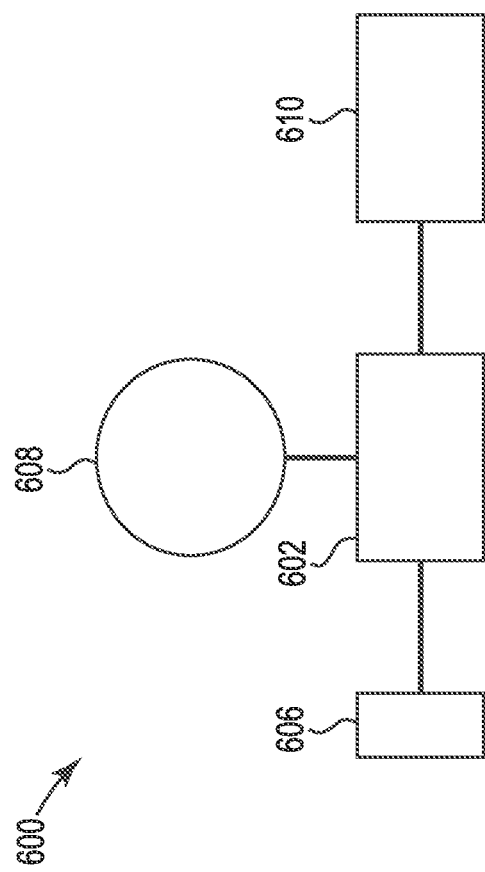
FIG. 6 is another example of a power source arrangement for a self-testing alarm system, in accordance with one or more embodiments of the present disclosure.

FIG. 6 is another example of a power source arrangement for a self-testing alarm system, in accordance with one or more embodiments of the present disclosure. As illustrated, the components of the self-test alarm system device 600 include a self-test module 608 electrically connected to an independent secondary power source 612. The independent power source 612 is electrically connected to the controller 604. Also electrically connected to the independent power source 612 is a detector 610.

Similar to the embodiment illustrated in FIG. 5, the embodiment of FIG. 6 provides a self-test alarm system device having a self-testing capability that can include a first independent power source connected to a self-test module and to a controller, wherein the first independent power source is not connected to a power supply.

In some embodiments, the first independent power source can also be electrically connected to a detector module. For example, such an arrangement is illustrated in FIG. 6.

As discussed above with regard to the controllers used in these power arrangements, a controller can have a processor and memory or firmware to execute instructions to carry out the functions of the circuit to which they are connected. As used herein, memory can be any type of storage medium that can be accessed by the processor to perform various examples of the present disclosure. For example, the memory can be a non-transitory computer readable medium having computer readable instructions (e.g., executable instructions/computer program instructions) stored thereon that are executable by the processor for self-test alarm system device maintenance including self-test process for testing one or more detector modules within a self-test alarm system device, in accordance with the present disclosure. The computer readable instructions can be executable by the processor to generate mist, heat, a chemical, etc. to elicit a hazard alert signal by the self-test alarm system device.

The memory can be volatile or nonvolatile memory. The memory can also be removable (e.g., portable) memory, or non-removable (e.g., internal) memory. For example, the memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory is illustrated as being located within mobile device, embodiments of the present disclosure are not so limited. For example, memory can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A self-test alarm system device having a self-testing capability wherein the device comprises:
    a first independent power source connected to a detector module; and
    a second independent power source connected to a self-test module, and wherein the second power source is not connected to a power supply, and wherein the second independent power source is electrically connected to a controller different from the controller connected to the first independent power source.

2. The self-test alarm system device of claim 1, wherein the second independent power source is directly electrically connected to a power loop.

3. The self-test alarm system device of claim 2, wherein the second independent power source is directly electrically connected to the self-test module.

4. The self-test alarm system device of claim 1, wherein the second independent power source is directly electrically connected to the self-test module.

5. The self-test alarm system device of claim 1, wherein the second independent power source receives a trickle charge from the power loop.

6. The self-test alarm system device of claim 1, wherein the self-test alarm system device further includes a controller directly electrically connected to a power loop.

7. The self-test alarm system device of claim 1, wherein the self-test alarm system device further includes a charger directly electrically connected to a power loop.

8. The self-test alarm system device of claim 7, wherein the charger is directly electrically connected to the second independent power source and provides power from the power loop to the second independent power source.

9. A self-test alarm system device having a self-testing capability wherein the device comprises:
    a first independent power source connected to a detector module; and
    a second independent power source connected to a self-test module, wherein the second power source is electrically connected between the self-test module and a controller, and wherein the second power source is not connected to a power supply, and wherein the second independent power source is electrically connected to a controller different from the controller connected to the first independent power source.

10. The self-test alarm system device of claim 9, wherein the controller is directly electrically connected to the second independent power source.

11. The self-test alarm system device of claim 9, wherein the controller is directly electrically connected to a power loop.

12. A self-test alarm system device having a self-testing capability wherein the device comprises:
    a first independent power source connected to a self-test module and to a controller, wherein the first independent power source is not connected to a power supply; and
    wherein a second independent power source is connected to a detector module and wherein the second power source is not connected to a power supply, and wherein the second independent power source is electrically connected to a controller different from the controller connected to the first independent power source.

13. The self-test alarm system device of claim 12, wherein the first independent power source is electrically connected between the self-test module and the controller.

14. The self-test alarm system device of claim 12, wherein the second independent power source is electrically connected to a controller.

15. The self-test alarm system device of claim 12, wherein the detector module is a battery powered, wireless, detector module.

16. The self-test alarm system device of claim 12, wherein the first independent power source is further electrically connected to a detector module.

17. The self-test alarm system device of claim 12, wherein the first independent power source connected to the self-test module is a battery power source.

18. The self-test alarm system device of claim 12, wherein the first independent power source is electrically connected between the controller and the self-test module.

* * * * *